United States Patent
Bonnin et al.

(10) Patent No.: US 12,360,404 B2
(45) Date of Patent: Jul. 15, 2025

(54) GEOMETRICO-MORPHOLOGICAL PARAMETER OF A SUBJECT WEARING AN EYEWEAR

(71) Applicant: Essilor International, Charenton-le-Pont (FR)

(72) Inventors: Thierry Bonnin, Charenton-le-Pont (FR); Alvin Francois, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 519 days.

(21) Appl. No.: 17/787,242

(22) PCT Filed: Dec. 16, 2020

(86) PCT No.: PCT/EP2020/086538
§ 371 (c)(1),
(2) Date: Jun. 17, 2022

(87) PCT Pub. No.: WO2021/122826
PCT Pub. Date: Jun. 24, 2021

(65) Prior Publication Data
US 2023/0020160 A1    Jan. 19, 2023

(30) Foreign Application Priority Data
Dec. 19, 2019   (EP) .................. 19306711

(51) Int. Cl.
*G02C 13/00* (2006.01)
*G06T 7/73* (2017.01)
(Continued)

(52) U.S. Cl.
CPC ............. *G02C 13/005* (2013.01); *G06T 7/74* (2017.01); *G06V 10/34* (2022.01); *G06V 40/161* (2022.01);
(Continued)

(58) Field of Classification Search
CPC ...... G02C 13/005; G02C 13/003; G06T 7/74; G06V 40/171
See application file for complete search history.

(56) References Cited

U.S. PATENT DOCUMENTS 7,434,931 B2 * 10/2008 Warden .................. G02C 7/027
351/204
8,733,936 B1    5/2014 Kornilov et al.
(Continued)

FOREIGN PATENT DOCUMENTS

CA    2884576 A1 *  3/2014  ........... G02C 13/003
CN    103827735 A    5/2014
(Continued)

OTHER PUBLICATIONS

Combined Chinese Office Action and Search Report issued Dec. 26, 2023 in Chinese Application No. 202080087709.3, 9 pgs.
(Continued)

*Primary Examiner* — Michael Robert Cammarata
(74) *Attorney, Agent, or Firm* — Oblon, McClelland, Maier & Neustadt, L.L.P.

(57) ABSTRACT

A method for determining a value of at least one geometrico-morphological parameter of a subject wearing an eyewear. The method including obtaining at least one image of a head of the subject wearing the eyewear, identifying simultaneously, on the at least one image obtained, a set of remarkable points of the image of the eyewear and a set of remarkable points of the image of the head of the subject, using an image processing algorithm determined based on a predetermined database comprising a plurality of reference images of heads wearing an eyewear, the image processing algorithm being based on machine learning, and determining at least one value of a geometrico-morphological parameter taking into
(Continued)

account the sets of remarkable points of the image of the eyewear and head of the subject identified.

14 Claims, 2 Drawing Sheets

(51) Int. Cl.
*G06V 10/34* (2022.01)
*G06V 40/16* (2022.01)

(52) U.S. Cl.
CPC .. *G06V 40/171* (2022.01); *G06T 2207/30201* (2013.01)

(56) References Cited

U.S. PATENT DOCUMENTS

| | | | | |
|---|---|---|---|---|
| 9,817,248 B2* | 11/2017 | Yang | | G06T 17/00 |
| 10,042,188 B2* | 8/2018 | Choukroun | | G06T 7/13 |
| 10,156,740 B2* | 12/2018 | Tadokoro | | G06T 7/0014 |
| 10,591,752 B1* | 3/2020 | Zhang | | G02B 27/32 |
| 10,685,457 B2* | 6/2020 | Cook | | G06V 40/167 |
| 11,579,472 B2* | 2/2023 | El-Hajal | | G06T 7/50 |
| 11,915,381 B2* | 2/2024 | Schwarz | | G06T 19/20 |
| 2003/0090625 A1* | 5/2003 | Izumitani | | G02C 13/003 351/204 |
| 2014/0293220 A1* | 10/2014 | Kornilov | | G02C 7/027 351/204 |
| 2015/0049306 A1* | 2/2015 | Haddadi | | A61B 3/0008 351/246 |
| 2015/0055085 A1* | 2/2015 | Fonte | | G02C 7/024 700/98 |
| 2015/0055086 A1 | 2/2015 | Fonte et al. | | |
| 2015/0154322 A1 | 6/2015 | Fonte et al. | | |
| 2015/0154678 A1 | 6/2015 | Fonte et al. | | |
| 2015/0154679 A1 | 6/2015 | Fonte et al. | | |
| 2015/0212343 A1 | 7/2015 | Fonte et al. | | |
| 2015/0293381 A1 | 10/2015 | Mizuno et al. | | |
| 2016/0054594 A1* | 2/2016 | Barton | | G02C 13/003 351/227 |
| 2016/0062151 A1 | 3/2016 | Fonte et al. | | |
| 2016/0062152 A1 | 3/2016 | Fonte et al. | | |
| 2016/0327814 A1* | 11/2016 | Marie | | G06T 7/62 |
| 2017/0068121 A1 | 3/2017 | Fonte et al. | | |
| 2017/0269385 A1 | 9/2017 | Fonte et al. | | |
| 2017/0336654 A1* | 11/2017 | Seitz | | G02C 13/005 |
| 2018/0299704 A1 | 10/2018 | Fonte et al. | | |
| 2019/0108687 A1 | 4/2019 | Kelly et al. | | |
| 2019/0146246 A1 | 5/2019 | Fonte et al. | | |
| 2019/0339546 A1* | 11/2019 | El-Hajal | | G02C 13/005 |
| 2020/0054209 A1* | 2/2020 | Zhang | | G02C 13/003 |
| 2020/0103675 A1* | 4/2020 | Schwarz | | G06F 30/27 |
| 2020/0233239 A1* | 7/2020 | Schwarz | | G02C 13/005 |
| 2020/0285081 A1 | 9/2020 | Fonte et al. | | |
| 2021/0231974 A1* | 7/2021 | Kelly | | G02C 13/003 |
| 2023/0010378 A1* | 1/2023 | Allione | | G06Q 30/0621 |

FOREIGN PATENT DOCUMENTS

| | | | | | |
|---|---|---|---|---|---|
| CN | 103838378 A | | 6/2014 | | |
| CN | 104168817 A | | 11/2014 | | |
| CN | 104408426 A | * | 3/2015 | | G06K 9/00248 |
| CN | 106922182 A | | 7/2017 | | |
| CN | 109063539 A | * | 12/2018 | | G06K 9/00228 |
| CN | 110235052 A | | 9/2019 | | |
| DE | 102008012268 A1 | | 9/2009 | | |
| DE | 102005063668 B3 | * | 9/2018 | | G02C 13/003 |
| EP | 3 410 178 A1 | | 12/2018 | | |
| WO | WO 2017/138004 A1 | | 8/2017 | | |
| WO | WO 2017/205903 A1 | | 12/2017 | | |
| WO | WO 2018/137863 A1 | | 8/2018 | | |
| WO | WO 2018/199890 A1 | | 11/2018 | | |
| WO | WO-2020119843 A1 | * | 6/2020 | | G02C 13/003 |
| WO | WO-2020182867 A1 | * | 9/2020 | | G02C 13/003 |

OTHER PUBLICATIONS

Chinese Office Action with Search Report dated May 31, 2024 in corresponding Chinese Patent Application No. 202080087709.3 (English translation only), 8 pages.
International Search Report issued Feb. 24, 2021, in PCT/EP2020/086538 filed Dec. 16, 2020, 5 pages.

* cited by examiner

GEOMETRICO-MORPHOLOGICAL PARAMETER OF A SUBJECT WEARING AN EYEWEAR

TECHNICAL FIELD OF THE INVENTION

The invention relates to a method for determining a value of at least one geometrico-morphological parameter of a subject wearing an eyewear.

This method may be used to determine a vision correction equipment customized for this subject.

BACKGROUND INFORMATION AND PRIOR ART

Manufacturing an ophthalmic lens adapted to a subject and an eyewear frame in order to provide the subject with appropriate ophthalmic equipment requires the determination of a number of fitting data for fitting the lens in the chosen eyewear.

In order to obtain these fitting data, the determination of geometrico-morphological parameters of the subject is necessary.

Numerous documents describe devices and methods for determining such parameters. These parameters include for example the interpupillary distance of the subject and/or the fitting height, corresponding to the vertical distance between the pupil of the eye of the subject and the bottom edge of the eyewear or lens worn by the subject, in conditions of use.

Known methods usually require the intervention of an eye care professional. For example, the eye care professional may manually measure the fitting height with a ruler.

Other known methods are based on the treatment of images of the head of the subject wearing the chosen eyewear. In such known methods, the position of the image of the eyewear, for example a position of an edge of the lens outline and the position of the image of the pupil of the subject on the captured image are determined independently from each other and the values of the looked-for geometrico-morphological parameters are deduced therefrom.

In this context, the accuracy of the values of the geometrico-morphological parameter determined depends on the accuracy of the determination of the position of the image of the lens outline and the image of the pupil. Moreover, state of the art methods require two independent steps of identification, of the eyewear on the one hand, and of the head features on the other.

SUMMARY OF THE INVENTION

Therefore one object of the invention is to provide a new method for determining an accurate value of at least one geometrico-morphological parameter of a subject wearing an eyewear for precisely determining a vision correction equipment customized for this subject, in a fast and easy way.

The above object is achieved according to the invention by providing a method wherein said at least one geometrico-morphological parameter comprises either:
  a parameter linked to both a head of the subject and said eyewear; or
  a parameter linked only to the morphology of the subject; or
  a parameter linked only to the geometry of the eyewear;
  said method being computer implemented, and wherein the following steps are performed:
  a) obtaining at least one image of the head of the subject wearing said eyewear;
  b) identifying simultaneously, on said at least one image obtained in step a), a set of remarkable points of the image of the eyewear and a set of remarkable points of the image of the head of the subject, using an image processing algorithm determined based on a predetermined database comprising a plurality of reference images of heads wearing an eyewear, said image processing algorithm being based on machine learning,
  c) determining said at least one value of a geometrico-morphological parameter taking into account said sets of remarkable points of the image of the eyewear and head of the subject identified in step b).

The Applicant's research has indeed shown that a simultaneous identification of both the eyewear and the subject's head remarkable points allows an accurate identification of the images of the eyewear and of the head features of the subject. The relative position of the eyewear features and head features of the subject are indeed correlated.

According to the method described in the present disclosure, head and eyewear are treated as a single object and the remarkable points of head and eyewear are researched together and identified in a single step.

Performing a global identification of eyewear and head features by simultaneously identifying remarkable points of the eyewear and of the head of the subject increases the performance of the image processing algorithm for identification of remarkable points of the eyewear and/or head of the subject.

As the position of the image of the eyewear and the images of the head features are accurately determined thanks to the method according to the present disclosure, the value of the geometrico-morphological parameter determined is also accurate.

Another advantage of the method according to the invention is its adaptability. The image processing algorithm can be easily adapted to different population of subjects and/or different trends of eyewear. This image processing algorithm is indeed determined by machine learning techniques, based on a predetermined database comprising a plurality of reference images of heads wearing an eyewear. This predetermined database may be adjusted by selecting reference images depending on subject features such as age, ethnical and/or geographical origins and/or depending on eyewear features such as type of frame (with full circle, partial circle or no circles), shape of the lenses, material of the frame, tint/refraction features of the lens.

The method according to the present disclosure is then particularly useful when the lenses of the eyewear worn by the subject during step a) of image capture comprise tinted and/or corrective lenses. In theses conditions, it may be more difficult to identify the image of the eyewear or of the head features on the captured image using state of the art methods, whereas the method according to the invention allows accurate identification.

The method is moreover performed quickly, in a single step.

Other advantageous and optional features of the method according to the invention are the following:
  said remarkable points of the image of the eyewear belong to the outline of the image of the eyewear;
  said remarkable points of the image of the head of the subject belong to the image of the eye of the subject and/or to the image of the jaw line of the subject and/or to the image of the nose of the subject and/or to the image of the mouth of the subject, and/or to the image of the eyebrow of the subject;

in step b), the position of each remarkable point of said sets of remarkable points of the image of the head and eyewear is determined in a reference plane of said image of the head obtained in step a);

in step a), the subject is in a natural posture when said at least one image of the head is obtained; therefore said at least one image obtained in step a) shows the subject in a natural posture;

in step a), said at least one image of the head of the subject wearing said eyewear is captured with an image capture apparatus placed in front of the head of the subject wearing said eyewear or retrieved by a computer from a database;

in step a), a plurality of images of the head of the subject wearing said eyewear are obtained, step b) and c) are performed for each image of said plurality of images of the head of the subject and a final value of the geometrico-morphological parameter is determined based on the values of the geometrico-morphological parameter determined in each step c);

said plurality of images of the head of the subject wearing said eyewear is captured with an image capture apparatus with different postures of the head of the subject relative to the image capture apparatus;

in step b), a first group of remarkable points of the image of the eyewear and/or head of the subject is identified by applying a first image processing algorithm to the whole image of the head wearing said eyewear and, based on this first group of remarkable points, a part of said at least one image of the head wearing said eyewear is selected, and a second group of remarkable points of the eyewear and/or head of the subject is identified by applying a second image processing algorithm only to said part of the image of the head wearing said eyewear selected, wherein at least one of said first and second processing algorithm is said image processing algorithm and the corresponding first or second group of remarkable points is a group of remarkable points of the eyewear and head of the subject;

the number of remarkable points of the image of the eyewear and head to identify is predetermined;

said predetermined database comprising said plurality of reference images of heads wearing an eyewear and associated predetermined sets of the corresponding remarkable points of each reference image of the eyewear and of the corresponding remarkable points of each reference image of the head of the subject, the image processing algorithm is trained on said predetermined database before performing step b);

said predetermined database is determined taking into account at least one of the following parameters relative to the subject;

world region of the subject;

habits of the subject;

head morphology of the subject;

shape of the eyewear frame or lenses worn by the subject;

said at least one geometrico-morphological comprises one of the following:

an inter-pupillary distance;

a fitting height;

a plurality of fitting height;

mean and/or standard deviation of fitting height, eyewear frame and/or lens shape and/or size;

head shape;

contact points of eyewear frame on head;

head orientation.

The invention also relates to a system for determining at least one geometrico-morphological parameter of a subject wearing an eyewear, said at least one geometrico-morphological parameter comprising either:

a parameter linked to both a head of the subject and said eyewear; or a parameter linked only to the morphology of the subject; or a parameter linked only to the geometry of the eyewear; and said system comprising:

an input device for obtaining at least one image of a head of the subject wearing said eyewear; and a processing unit adapted to:

identify simultaneously, on said at least one image obtained by said input device, a set of remarkable points of the image of the eyewear and a set of remarkable points of the image of the head of the subject, using an image processing algorithm determined based on a predetermined database comprising a plurality of reference images of heads equipped with an eyewear, said image processing algorithm being based on machine learning, determine said at least one value of a geometrico-morphological parameter taking into account said sets of remarkable points of the image of the eyewear and head of the subject identified.

Said processing unit preferably comprises a processor programmed to perform these steps. The method is therefore preferably computer implemented.

This system allows implementing the method described above.

DETAILED DESCRIPTION OF EXAMPLE(S)

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

The invention provides a method for determining a value of at least one geometrico-morphological parameter of a subject wearing an eyewear 10.

Figure 2:
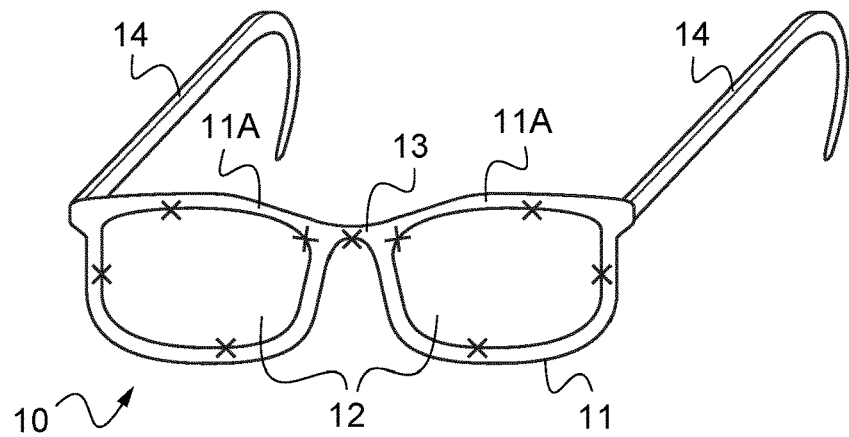
FIG. 2 is a schematic representation of a set of remarkable points of the eyewear included in said complete set of remarkable points of FIG. 1, shown on said eyewear, where each remarkable point of the eyewear is represented by a cross.

The eyewear 10, represented for example on FIG. 2, comprises a frame 11 and at least one lens 12 mounted in this frame 11. The frame 11 may comprise a full circle 11A surrounding each lens 12, as it is the case on FIG. 2, a partial circle partially surrounding each lens or no circle. The circles 11A are linked by a bridge 13 and are each connected to a temple 14. In the case where the frame has no circle, the bridge and temples are directly connected to the lenses.

Each lens can be a piano lens or a corrective lens having a refractive power.

Said at least one geometrico-morphological parameter may comprise either

- a parameter linked to both head and eyewear, for example whose value depends on the relative position of the eyewear when fitted on the head of the subject; or
- a parameter linked only to the morphology of the subject, for example whose value depends on the shape of the head of the subject and/or on the position of the features of the head of the subject, such as the relative positions of the eyes; or
- a parameter linked only to the geometry of the eyewear, for example whose value depends only on the shape of the eyewear.

Such a geometrico-morphological parameter may for example comprise one of the following parameter linked to both head and eyewear:

- a fitting height FH (FIG. 1), corresponding to the vertical distance between the center of a pupil 21A of the eye 21 of the subject and the bottom edge of the lens 12 or frame 11 in condition of wear of the eyewear 10,
- a plurality of fitting height values and/or a mean value and/or a standard deviation value of the plurality of fitting height values,
- position of at least one contact point of the eyewear on the head of the subject.

It may for example comprise one of the following parameter linked only to the morphology of the subject:

- inter-pupillary distance IPD (FIGS. 1 and 3), corresponding to the distance between the centers of the pupils 21A of the eyes 21 of the subject,
- head shape classification, for example as round, square, oval, triangular, or according to predetermined head models.

It may for example comprise one of the following parameter linked only to the geometry of eyewear: frame and/or lens shape and size, for example the A, B and D dimensions usually measured in the boxing system of the frame. This boxing system corresponds to the smallest horizontal rectangle in which a circle 11A of the frame 11 fits. A and B correspond to the width and height of this rectangle. D corresponds to the distance between the right lens boxing and the left lens boxing.

A value of at least one of these geometrico-morphological parameters may be used to accurately place a corrective lens in the frame chosen by the subject.

Additionally, a value of a postural parameter may also be determined. This postural parameter is linked to the position of the head relative to the image capture apparatus. It comprises for example the orientation angles of the head around two orthogonal axes.

The value of the postural parameter is especially useful when the image of the head with eyewear of the subject is not captured in a natural posture. The value of the postural parameter may then be used to correct the positions of the remarkable points determined and/or the geometrico-morphological parameter's value determined.

According to the present disclosure, the method for determining said value of at least one geometrico-morphological parameter comprises the following steps:

a) obtaining at least one image I of a head 20 of the subject wearing said eyewear 10;

b) identifying simultaneously, on said at least one image I obtained in step a), a set of remarkable points RPE (FIG. 1) of the image I10 of the eyewear and a set of remarkable points RPH (FIG. 1) of the image of the head I20 of the subject, using an image processing algorithm determined based on a predetermined database comprising a plurality of reference images of heads wearing eyewear, c) determining said at least one value of a geometrico-morphological parameter taking into account said sets of remarkable points of the image of the eyewear and head of the subject identified in step b).

Figure 1:
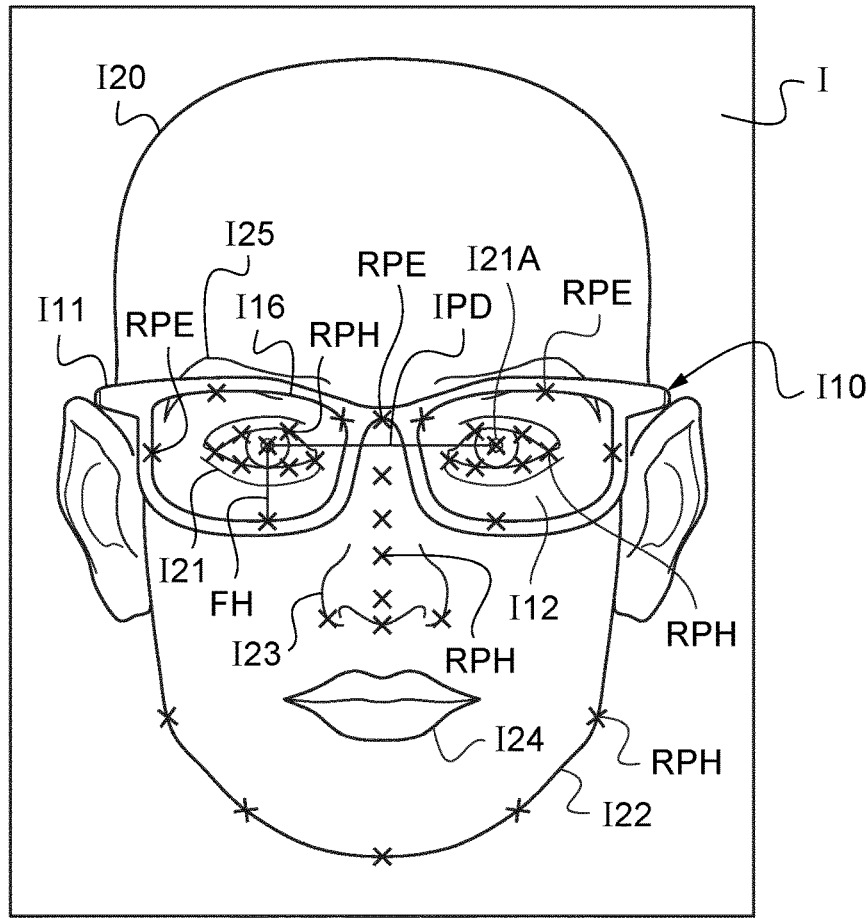
FIG. 1 is a schematic representation of a complete set of remarkable points of head and eyewear used in the method according to the invention shown on an image of head with eyewear of the subject, where each remarkable point of the image is represented by a cross.
Figure 3:
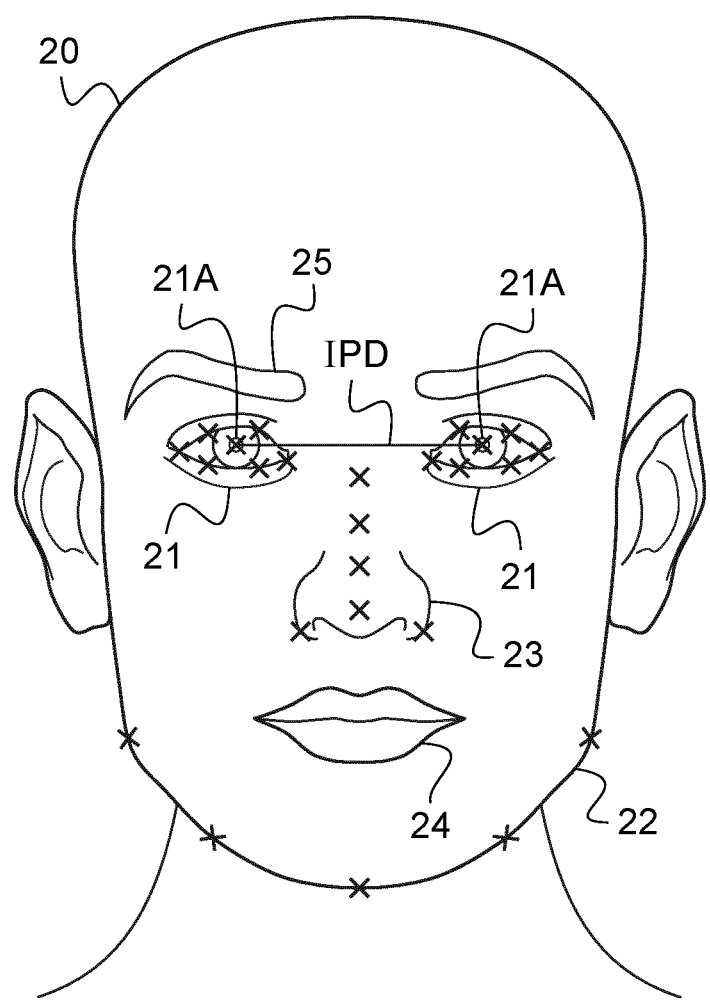
FIG. 3 is a schematic representation of a set of remarkable points of the head included in said complete set of remarkable points of FIG. 1, shown on the head of the subject where each remarkable point of the head is represented by a cross.

An example of said set of remarkable points is schematically represented on the image of the head an eyewear of FIG. 1. Each point is represented by a cross. FIGS. 2 and 3 show the corresponding positions of these points on the eyewear and the head of the subject separately for clarity.

Step a)

In a first step a) of the method according to the invention, at least one image I (FIG. 1) of the head 20 of the subject wearing the eyewear 10 is obtained.

More precisely, this at least one image I of the head of the subject wearing the eyewear may be

- captured with an image capture apparatus placed in front of the head 20 of the subject or
- retrieved by a computer from a database.

Said image capture apparatus may comprise a camera or a video camera or a plurality of camera or video camera. A single image, a plurality of single images or a sequence of images forming a video may be captured. In the case where a video is recorded, a single image or a plurality of images may be extracted from the video.

According to an embodiment of the present method, step a), b) and c) are performed only once. A single image I is then treated.

According to an embodiment of the present method, step a) is repeated in order to obtain a plurality of image of the head of the subject wearing the eyewear or a plurality of images, such as a video, is recorded or retrieved in step a).

It is for example a facial image. The image capture apparatus is placed in front of the head 20 of the subject.

The image capture may be performed by the subject himself or by another person such as an eye care professional.

Said computer comprises for example one or more processors and one or more memories. The database from where the image is retrieved may be stored in the computer memory, on a distant server or on a cloud server accessed by said computer through a communication system of said computer.

In an embodiment, in step a), said at least one image of the head obtained shows the subject in a natural posture.

More precisely, in the case where the image I of the head 20 of the subject wearing the eyewear 10 is captured with an image capture apparatus, the subject is placed in the natural posture before capturing said image.

In the following, the wording "natural posture" is defined as a posture in which the position of the head is not imposed by a physical constraint such as applying a part of the head against a surface. The natural posture assumed by the subject is preferably the posture where he looks straight ahead to the horizon without any constraint. This natural posture is also called orthostatic posture and corresponds to the position in which the individual achieves minimal efforts. The corresponding gaze directions are the primary gaze directions.

In this natural posture, the Frankfurt plane of the head is horizontal. The Frankfurt plane is defined as the plane passing through the inferior margin of an orbit (for example, the point called the left orbital) and the upper margin of each ear canal or external auditory meatus, a point called the porion.

In order to ensure that the subject is in the natural posture, he is asked to look straight ahead, in the distance, at the horizon if possible or at least at a point located at a distance over 3 meters from him, preferably over 6 meters.

In the embodiment where an image is retrieved from a database in step a), this image has for example been captured in a preliminary step with the subject in a natural posture, as defined above.

Obtaining an image of the subject in natural posture allows determining an accurate value of the geometrico-morphological parameter. Deviation from the natural posture induces parallax errors when measuring the values of geometrico-morphological parameter such as interpupillary distance and fitting height.

As mentioned before, determining a value of a postural parameter is especially useful when the image of the head with eyewear of the subject is not captured in a natural posture, as this value of the postural parameter may then be used to correct the positions of the remarkable points determined and/or the geometrico-morphological parameter's value determined based on this image.

Step b)

In step b), a set of remarkable points RPE of the image I10 of the eyewear 10 and a set of remarkable points RPH of the image I20 of the head 20 of the subject are identified simultaneously on said image I obtained in step a).

The set of remarkable points RPE of the image I10 of the eyewear 10 and the set of remarkable points RPH of the image I20 of the head 20 of the subject form a complete set of remarkable points of eyewear and head. This complete set of head and eyewear remarkable points form a head and eyewear model that the image processing algorithm is trained to detect in any image of a head wearing eyewear.

In practice, this complete single set of remarkable points belonging to both the image of the head of the subject and the image the eyewear is identified in a single identification step.

Said set of remarkable points RPE of the image I10 of the eyewear 10 comprises for example remarkable point belonging to the outline I16 of the image of the eyewear I10.

The remarkable points of the image I10 of the eyewear 10 may in particular belong to the outline of the image of the frame I11 or to the outline I16 of the image of the lens I12. An example of the remarkable point of the eyewear taken into account is represented for more clarity on FIG. 2.

Said set of remarkable points RPH of the image I20 of the head of the subject comprises advantageously remarkable points of the image of the face of the subject. An example of the remarkable point of the head taken into account is represented on FIG. 3.

An example of the complete set of remarkable points identified on the image of head and eyewear of the subject is represented on FIG. 1. The remarkable points RPE, PRH are represented by crosses. This complete set of remarkable points comprises here 9 remarkable points of the outline of the image of the frame of the eyewear and 26 remarkable points of the head of the subject.

The corresponding head and eyewear model comprises therefore 35 remarkable points of both head and eyewear.

The remarkable points of the eyewear comprise here four points of the outline of each lens, or of the inner outline of each circle of the frame (FIGS. 1 and 2). Preferably, the remarkable points of the eyewear comprise at least four points.

These four points correspond here to the intersection points between the outline of the lens and the lines defining the smallest horizontal rectangle fitting the lens, in other words the intersections between the outline of the lens and the boxing system of said lens.

The remarkable points of the eyewear comprise here also the intersection of a median plane of the frame and the lower edge of the outline of the bridge of the frame (FIGS. 1 and 2).

Alternatively, the remarkable points of the eyewear may comprise any other points of the frame and lens, for example points whose positions are deduced from the positions of the remarkable points defined above, or points of the outer outline of the frame, such as most lateral points of the outline of the frame for example.

For example remarkable points belong to the frame along the outline of the lens.

The remarkable points of the head 20 of the subject belong for example to the image I21 of the eye 21 of the subject or to the image I21A of the pupil 21A of the subject and/or to the image I22 of the jaw line 22 of the subject and/or to the image I23 of the nose 23 of the subject and/or to the image I24 of the mouth 24 of the subject, and/or to the image I25 of the eyebrow 25 of the subject (FIGS. 1 and 3).

In the example of FIGS. 1 and 3, the remarkable points of the head of the subject comprise here 5 points of the outline of the jaw line of the subject, 4 points of the nose axis, 3 points of the nose outline, 6 points of the outline of each eye, including the corners of each eye, and the centers of the pupils.

Other remarkable points of the head of the subject may be taken into account. Example of an extended set of remarkable points of the head only of the subject is for example given by the 68 points detected by the Dlib 68-landmarks detector. Advantageously, in the method according to the invention, less than 68 points are needed. The remarkable points of the head preferably comprise points of each of the eyes as well as points used for face symmetry, such as the points of the nose.

According to the method described in the present disclosure, the image captured in step a) is treated thanks to the image processing algorithm as described hereafter in order to identify the remarkable points of the head and eyewear taken into account.

In practice, in step b), the position of each remarkable point of said sets of remarkable points of the image of the head and frame is determined in a reference plane of said image of the head obtained in step a). Said reference plane corresponds to the plane of image capture. The positions of said remarkable points are therefore determined in a referential linked to the image captured.

In practice, when the image is a facial image captured with the subject in natural posture, the reference plane of the image is parallel to a facial plane of the subject perpendicular to the Frankfurt plane and to a sagittal plane of the head of the subject.

According to an embodiment of the present method:
a first group of remarkable points of the image of the frame and/or head of the subject is identified by applying a first image processing algorithm to the whole image of the head and, based on this first group of remarkable points, a part of said at least one image of the head is selected, and a second group of remarkable points of the frame and/or head of the subject is identified by applying a second image processing algorithm only to said part of the image of the head selected, wherein at least one of said first and second processing algorithm is said image processing algorithm and the corresponding first or second group of remarkable points is a group of remarkable points of the frame and head of the subject.

This way it is possible to use either a method according to the present disclosure, or another type of method, using an image processing algorithm that detects only remarkable points of the head or remarkable points of the eyewear, in order to preselect a region of interest of the image captured in step a), before using the method according to the invention on said region of interest of said image. The method is then very quickly implemented.

It is also considered using the method according to the present disclosure on the full image in order to preselect a region of interest of the image captured in step a), and using either a method according to the invention, or another type of method using an image processing algorithm detecting only remarkable points of the head or remarkable points of the eyewear, on said region of interest of said image.

These two embodiments allow an accurate identification of the complete set of remarkable points while limiting the time and resources spent on this identification.

Preferably, the number of remarkable points of the image of the frame and head to identify is predetermined.

As mentioned above, the remarkable points of the head and frame are identified thanks to an image processing algorithm using an eyewear and head model determined based on a predetermined database comprising a plurality of reference images of heads wearing an eyewear.

In another embodiment, in a preliminary step of the method described in the present disclosure, a box system framing the image of the head of the subject in the image captured is determined. This preliminary step may for example be achieved thanks to state of the art image processing technique available in DLIB library or OPENCCV library.

The identification of the complete set of remarkable points according to the present disclosure, that is, using the image processing algorithm described here, is then performed on the part of the image captured located inside this box system.

Said image processing algorithm is here based on machine learning. It is determined by machine learning techniques applied to the predetermined database described in the present disclosure. Such machine learning techniques are known and are not the object of the present disclosure, therefore they will not be described in further details. The image processing algorithm based on machine learning used is trained with a lot of reference images showing different heads, different eyewears, acquired with different conditions. These reference images are associated, for example annotated, with the positions of the remarkable points of the head and the eyewear. The positions of these remarkable points are used to define the model. The higher the number of images used for training, the higher the robustness of the model.

This image processing algorithm is trained on said predetermined database before performing step b).

Said predetermined database comprises said plurality of reference images of heads wearing an eyewear and associated predetermined sets of corresponding remarkable points of each reference image of the eyewear and of corresponding remarkable points of each reference image of the head of the subject. In practice, said reference images are registered in association with the identification of the complete set of remarkable points considered in the method. In a general manner, the reference images are images of individual different from the subject whose image is to be treated. Alternatively, at least one reference image of the subject himself may be taken into account in said predetermined database.

The remarkable points are for example manually identified on each reference image of said predetermined database, or identified with another image processing algorithm. In other words, each reference image of said predetermined database is saved in correspondence with the positions of each remarkable points of its complete set of remarkable points.

Said predetermined database comprises as many reference images of different combination of heads and eyewear as possible, along with the corresponding positions of the remarkable points of said complete set of remarkable points.

According to different embodiments of the method described in the present disclosure, said predetermined database comprises as least 400 reference images of different heads with eyewear, preferably at least 500, preferably at least 1000 reference images, preferably at least 2000, preferably at least 3000 reference images, preferably at least 4000 reference images, preferably more than 4000 reference images.

In an embodiment where the image of the subject is captured in natural posture, the predetermined database accordingly comprise a majority of reference images where the head of the subject is in a natural posture.

In order to allow treating image captured in postures different from the natural posture, said image processing algorithm may be trained on a predetermined database comprising reference images in many different postures.

Moreover, in an embodiment where the method presently described provides a value of a posture parameter by treating said image thanks to said image processing algorithm, said predetermined database comprises reference images of heads of individuals with eyewear with different postures of the head of the individual relative to the image capture apparatus. The corresponding posture is registered in said predetermined database in association with each reference image. Posture parameters could alternatively be obtained by using algorithm machine learning as this algorithm may provide data about eyewear position and sizing and head position and sizing according to the individual's environment. Head position and sizing give access to posture parameters of the individual.

In a general manner, said predetermined database preferably comprises reference images of heads with eyewear with different shapes of the head of the individuals and different shapes of eyewear.

Said predetermined database also comprises reference images of heads of individuals with eyewear where the individual come from different world regions, have different habits, different head morphologies, different sex, different age.

A very wide predetermined database covering a lot of different head/eyewear combination ensures a good accuracy of the identification of the remarkable points.

Another possibility to increase the accuracy of the identification of the remarkable points is to determine a customized database for the subject in order to train the image processing algorithm on customized reference images that have the higher probability to be close to the image of the subject treated. It is for example considered to select the most relevant images of this wide predetermined database.

Said customized database is determined taking into account at least one of the following personal parameters relative to the subject to achieve said selection of said customized reference images:
world region of the subject;
optionally, habits of the subject;
head morphology of the subject;
shape of the eyewear worn by the subject;
sex of the subject;
age of the subject.

The customized database may be determined based on the criteria mentioned above, by selecting reference images from a wider predetermined database for which the individual with eyewear have one or more identical personal parameter's value or one of more values of personal parameter in a predetermined range relative to the values of the personal parameters of the subject. Then a customized database of images of heads with eyewear as close as possible to the head with eyewear of the subject may be obtained.

As a general example, the image processing algorithm was initially trained on a predetermined database comprising reference images of 19 men and 12 women, each man wearing each of 14 different eyewears and each woman wearing each of 17 different eyewears. The total number of reference images is then 456. Each reference image is associated with the positions of a complete set of the remarkable points of head and eyewear on this reference image, the positions of these remarkable points being manually determined.

The image processing algorithm thus trained provides a satisfactory accuracy for the treatment of the reference images. The shift between the positions of the remarkable points determined by the image processing algorithm and manually determined is indeed between 0 and 5 millimeters for 93% of the positions determined.

The image processing algorithm was then tested on a test image, different from the reference images, of another individual wearing another eyewear.

The image processing algorithm obtained was able to accurately determine 70% of the remarkable points of this other eyewear by treating the test image.

As a comparison, processing said test image with a method of the state of the art, using an algorithm determined to detect only the 9 remarkable points of the eyewear (as represented on FIG. 2 for example) led to the accurate determination of only 33% of these remarkable points.

These preliminary results are based on a simple modelling using only a few reference images for training. The results obtained with larger database will provide considerable improvements in accuracy.

The method described in the present disclosure therefore provides a higher accuracy in detecting the features of the eyewear by simultaneously detecting head and eyewear features, as compared to the state of the art where only the feature of the eyewear or only the features of the head of the subject are detected.

Step c)

In step c), said at least one value of a geometrico-morphological parameter is determined taking into account said sets of remarkable points of the image of the eyewear and head of the subject identified in step b).

For example, based on the positions of the pupils of the eyes of the subject determined in step b), the interpupillary distance IPD of the subject is determined. Based on the position of the pupil and the position of the remarkable point located on the bottom edge of the corresponding lens, the fitting height of subject may be determined.

The pantoscopic angle of the frame on the face of the subject, corresponding to the angle of the circles of the frame or of the lens relative to the facial plane of the subject, and perhaps vertex distance, that is to say the distance between the eye and the lens of the subject, could also be obtained.

The method described in the present disclosure may be performed by treating a single image of the head with eyewear of the subject. According to this embodiment of the present method, step a), b) and c) are performed only once.

A plurality of images of the head with eyewear of the subject may also be taken into account. According to another embodiment of the present method, step a) is repeated in order to obtain a plurality of images of the head of the subject wearing the eyewear or a plurality of images, such as a video, is recorded or retrieved in step a).

The plurality of images may be averaged by a mean or a weighted mean. The mean or weighted mean image is then treated in subsequent step b) and c).

Alternatively, in step a), a plurality of images of the head with eyewear of the subject are obtained, step b) is performed for each image of said plurality of images of the head with eyewear of the subject and a plurality of positions of each remarkable point is determined.

The position of the remarkable points taken into account in step c) may be the position of the remarkable points determined on a single image or on a plurality of images. In particular, the position of the remarkable points taken into account in step c) may be an average value of the position of the remarkable points determined on a plurality of images.

When a plurality of images of the head with eyewear of the subject are obtained in step a), steps b) and c) may also be performed for each image of said plurality of images of the head with eyewear of the subject and a plurality of values of the geometrico-morphological parameter may be determined. A final value of the geometrico-morphological parameter is then determined based on the values of the geometrico-morphological parameter determined in each step c).

For example, said final value of the geometrico-morphological parameter is determined as a mean value or weighted mean value of the values of the geometrico-morphological parameter determined in each step c).

This is particularly useful when said plurality of images of the head of the subject is captured with an image capture apparatus with different postures of the head of the subject relative to the image capture apparatus.

The predetermined database used to train the image processing algorithm used in the method described in the present disclosure, may be widened by including the results, optionally manually corrected, of the determination of the remarkable points of all the images treated.

This predetermined database may comprise image of subjects' head wearing eyewear with piano lenses, but also with vision correction lenses having sphere and cylinder powers.

The optical features of the lenses of the eyewear worn by the individuals on the reference image of the predetermined database, for example values of the sphere, cylinder and cylinder axis, may be registered in said predetermined database in association with said reference images and the corresponding positions of the remarkable points.

In this case, the image processing algorithm may also be trained to provide data regarding the optical features of the lenses of the eyewear worn by the subject on the image currently treated by said image processing algorithm.

The invention also relates to a system for determining at least one geometrico-morphological parameter of a subject wearing an eyewear, said system comprising:
- an input device for obtaining at least one image of a head of the subject wearing said eyewear; and
- a processing unit adapted to implement any embodiment of the method according to the present disclosure.

In particular, said processing unit comprises a processor programmed to:
- identify simultaneously, on said at least one image obtained by said input unit, a set of remarkable points of the image of the frame and a set of remarkable points of the image of the head of the subject, using an image processing algorithm determined based on a predetermined database comprising a plurality of reference images of heads equipped with a frame,
- determine said at least one value of a geometrico-morphological parameter taking into account said sets of remarkable points of the image of the frame and head of the subject identified.

Based on the detection of the remarkable points of the image treated, a more detailed analysis of this image may be performed. Further image processing may be implemented in order, for example, to determine the accurate position of other remarkable points such as center of pupils, lens or eyewear edges. This can be done by determining a region of interest of the image surrounding one or several remarkable points initially identified through the method according to the invention and using an edge detection filter or a color detection filter.

Thanks to the method and device according to the invention, head and eyewear features, that is to say here head and eyewear remarkable points, are detected in one pass, simultaneously. In particular, face and frame features, here the positions of face and frame remarkable points, are researched and determined all at once. This strategy increases the global performance of the image processing algorithm: the identification of the remarkable points of head and eyewear is more accurate. This leads to increased accuracy of the geometrico-morphological parameter value determined based on these remarkable points.

The invention claimed is:

1. A method for determining a value of at least one geometrico-morphological parameter of a subject wearing an eyewear, said at least one geometrico-morphological parameter comprising either:
   - a parameter linked to both a head of the subject and said eyewear; or
   - a parameter linked only to the morphology of the subject; or
   - a parameter linked only to the geometry of the eyewear;
   said method being computer implemented,
   wherein the following steps are performed:
   a) obtaining at least one image of the head of the subject wearing said eyewear;
   b) identifying simultaneously, on said at least one image obtained in step a), a set of remarkable points of the image of the eyewear and a set of remarkable points of the image of the head of the subject, using an image processing algorithm determined based on a predetermined database comprising a plurality of reference images of heads wearing an eyewear, said image processing algorithm being based on machine learning; and
   c) determining said at least one value of a geometrico-morphological parameter taking into account said sets of remarkable points of the image of the eyewear and head of the subject identified in step b).

2. The method according to claim 1, wherein said remarkable points of the image of the eyewear belong to the outline of the image of the eyewear.

3. The method according to claim 1, wherein said remarkable points of the image of the head of the subject belong to the image of the eye of the subject and/or to the image of the jaw line of the subject and/or to the image of the nose of the subject and/or to the image of the mouth of the subject, and/or to the image of the eyebrow of the subject.

4. The method according to claim 1, wherein in step b), the position of each remarkable point of said sets of remarkable points of the image of the head and eyewear is determined in a reference plane of said image obtained in step a).

5. The method according to claim 1, wherein, in step a), said at least one image obtained in step a) shows the subject in a natural posture.

6. The method according to claim 1, wherein, in step a), said at least one image of the head of the subject wearing said eyewear is
   captured with an image capture apparatus placed in front of the head of the subject, or
   retrieved by a computer from a database.

7. The method according to claim 1, wherein, in step a), a plurality of images of the head wearing said eyewear of the subject are obtained, step b) and c) are performed for each image of said plurality of images and a final value of the geometrico-morphological parameter is determined based on the values of the geometrico-morphological parameter determined in each step c).

8. The method according to claim 7, wherein said plurality of images of the head of the subject wearing said eyewear is captured with an image capture apparatus with different postures of the head of the subject relative to the image capture apparatus.

9. The method according to claim 1, wherein, in step b),
   a first group of remarkable points of the image of the eyewear and/or head of the subject is identified by applying a first image processing algorithm to the whole image of the head wearing said eyewear and, based on this first group of remarkable points, a part of said at least one image of the head wearing said eyewear is selected, and
   a second group of remarkable points of the eyewear and/or head of the subject is identified by applying a second image processing algorithm only to said part of the image of the head wearing said eyewear selected,
   wherein at least one of said first and second processing algorithm is said image processing algorithm and the corresponding first or second group of remarkable points is a group of remarkable points of the eyewear and head of the subject.

10. The method according to claim 1, wherein the number of remarkable points of the image head wearing said eyewear to identify is predetermined.

11. The method according to claim 1, wherein said predetermined database comprising said plurality of reference images of heads wearing an eyewear and associated predetermined sets of the corresponding remarkable points of each reference image of the eyewear and of the corresponding remarkable points of each reference image of the head of the subject, the image processing algorithm is trained on said predetermined database before performing step b).

12. The method according to claim 1, wherein said predetermined database is determined taking into account at least one of the following parameters relative to the subject:
   world region of the subject;
   habits of the subject;
   head morphology of the subject;
   shape of the eyewear worn by the subject.

13. The method according to claim 1, wherein said at least one geometrico-morphological parameter comprises one of the following:
   an inter-pupillary distance;
   a fitting height;
   a plurality of fitting height;
   mean and/or standard deviation of fitting height,
   eyewear frame or lens shape and/or size,
   head shape,
   position of contact points of eyewear on head.

14. A system for determining a value of at least one geometrico-morphological parameter of a subject wearing an eyewear, said at least one geometrico-morphological parameter comprising either:
   a parameter linked to both a head of the subject and said eyewear; or
   a parameter linked only to the morphology of the subject; or
   a parameter linked only to the geometry of the eyewear;
   said system comprising:
   an input device for obtaining at least one image of a head of the subject wearing said eyewear; and
   a processing unit adapted to:
      identify simultaneously, on said at least one image obtained by said input device, a set of remarkable points of the image of the eyewear and a set of remarkable points of the image of the head of the subject, using an image processing algorithm determined based on a predetermined database comprising a plurality of reference images of heads equipped with an eyewear, said image processing algorithm being based on machine learning, and
      determine said at least one value of a geometrico-morphological parameter taking into account said sets of remarkable points of the image of the eyewear and head of the subject identified.

* * * * *